US006066790A

United States Patent [19]

Freeland et al.

[11] Patent Number: 6,066,790

[45] Date of Patent: May 23, 2000

[54] MULTIPLE FREQUENCY DISPLAY FOR MUSICAL SOUNDS

[76] Inventors: Stephen J. Freeland, 2008 Bennington Cir.; Neil C. Skinn, 2526 Courtland Ct., both of Fort Collins, Colo. 80526

[21] Appl. No.: 08/679,057

[22] Filed: Jul. 12, 1996

Related U.S. Application Data

[60] Provisional application No. 60/001,205, Jul. 14, 1995.

[51] Int. Cl.[7] .................... G09B 15/02

[52] U.S. Cl. .................... 84/454; 84/453; 84/477 R; 84/DIG. 18

[58] Field of Search .................... 84/454, 453, 455, 84/477 R, DIG. 18

[56] References Cited

U.S. PATENT DOCUMENTS

| | | | |
|---|---|---|---|
| 4,024,789 | 5/1977 | Humphrey et al. | 84/454 |
| 4,088,052 | 5/1978 | Hedrick | 84/454 |
| 4,196,652 | 4/1980 | Raskin | 84/453 |
| 4,204,453 | 5/1980 | Gross | 84/454 |
| 4,207,791 | 6/1980 | Murakami | 84/454 |
| 4,313,361 | 2/1982 | Deutsch | 84/454 |
| 4,327,623 | 5/1982 | Mochida et al. | 84/454 |
| 4,392,409 | 7/1983 | Coad, Jr. et al. | 84/462 |
| 4,426,907 | 1/1984 | Scholz | 84/454 |
| 4,434,697 | 3/1984 | Roses | 84/454 |
| 4,479,416 | 10/1984 | Clague | 84/462 |
| 4,688,464 | 8/1987 | Gibson et al. | 84/454 |
| 4,690,026 | 9/1987 | McCoy | 84/454 |
| 4,732,071 | 3/1988 | Dentsch | 84/454 |
| 4,803,908 | 2/1989 | Skinn et al. | 84/454 |
| 4,909,126 | 3/1990 | Skinn et al. | 84/454 |
| 5,056,398 | 10/1991 | Adamson | 84/454 |
| 5,388,496 | 2/1995 | Miller et al. | 84/454 |

FOREIGN PATENT DOCUMENTS

| | | | |
|---|---|---|---|
| 87 07068 | 11/1987 | WIPO | G10G 7/02 |

OTHER PUBLICATIONS

"Digital Tuning System DTS–1 Owner's Manual", *TransPerformance*, Fort Collins, Co, Mar. 1993.

*Primary Examiner*—William M. Shoop, Jr.
*Assistant Examiner*—Marlon T. Fletcher
*Attorney, Agent, or Firm*—Greenlee, Winner and Sullivan, P.C.

[57] ABSTRACT

This invention is a display system for measuring and displaying, individually or simultaneously, the frequencies contained in a musical sound. A transducer coupled to the sound source produces an electrical signal representing the musical sound. The system receives the signal and separates and measures the frequencies of the individual tones comprising the sound. The measured frequency values are displayed as the frequencies themselves or as deviations from target frequencies. The system can utilize a local transducer with the display system or a remote transducer coupled to the sound source.

23 Claims, 4 Drawing Sheets

MULTIPLE FREQUENCY DISPLAY FOR MUSICAL SOUNDS

This application is based on Provisional Application 60/001,205, filed Jul. 14, 1995, which is incorporated herein by reference in its entirety.

FIELD OF THE INVENTION

This invention relates to a system for simultaneously displaying multiple frequencies occurring in a musical sound.

BACKGROUND OF THE INVENTION

Manually tuning a musical instrument can be a difficult and tedious process, usually requiring a considerable amount of time and skill. The tuning process can be simplified and made more accurate by the use of a device for indicating the frequency produced by an instrument to the person tuning it.

There are many different types of such devices, frequently called tuners, available for providing frequency information to the person tuning an instrument. One type of tuner is a device having a microphone for detecting the audible tone produced by an instrument and a meter or digital display for displaying the frequency of the tone to the person tuning the instrument. Another type of tuner is a tone generator for producing an audible reference tone to which a person can compare the frequency produced by the instrument being tuned. Tone generators range from simple tuning forks to electronic devices producing a wide range of selectable frequencies. However, these devices provide information about only one frequency at a time.

It is therefore an object of this invention to provide a display system for indicating multiple frequencies, either individually or simultaneously, contained within a musical sound. A further object of the invention is to enable a person to quickly and easily tune an instrument utilizing the multiple frequency display.

SUMMARY OF THE INVENTION

The invention is a display system for simultaneously showing a plurality of the frequencies (tones) comprising a musical sound.

The display system senses a plurality of frequencies and displays each frequency either individually or simultaneously with the other frequencies. The system enables an operator both to quickly determine the tuning of an instrument and to quickly and easily tune the instrument manually even if it is far out of tune. The system is useful for different kinds of instruments and sound sources. In different embodiments it can utilize different types of transducers to convert the sound into an electrical signal for processing. For example, it can utilize a microphone which is an integral part of the display system or it can use a separate microphone. It can also be adapted to connect to an existing transducer such as the magnetic pickup used by an electric guitar. The display system of the present invention does not require special transducers mounted on an instrument. It separates multiple frequencies, for example from multiple strings, without using a separate transducer for each string. It can therefore be used to tune a variety of different instruments and need not be dedicated to a single instrument. This is in contrast to the frequency display described in U.S. patent application Ser. No. 08/680,725, entitled "Frequency Display for an Automatically Tuned Stringed Instrument," Attorney Docket No. 19-95, filed concurrently herewith and incorporated by reference in its entirety herein.

The frequency display of the present invention has a multitude of applications. It is particularly suited to tuning stringed instruments having a plurality of strings. It could also be used by a plurality of vocalists to check and correct the frequencies of vocal harmonies. The following description is made with reference to a stringed instrument; it is to be understood that the invention can be used with any source of a plurality of frequencies, including a plurality of instruments or vocalists.

By displaying all frequencies simultaneously, the display system enables an operator to immediately see with a single strum the tuning of every string on a stringed instrument. The operator can then determine the magnitude and direction of adjustment needed for each string and make a first approximation to correcting the tuning of all the strings from the frequency information provided by the single strum. By seeing the entire tuning situation at once, the number of strums required to tune the instrument can be minimized. The simultaneous display also enables the operator to see at a glance if the instrument needs tuning and to make an estimate of the time required to tune if necessary. If before an audience and the instrument is out of tune, the operator can then decide to tell a story of appropriate length while tuning the instrument, or to switch instruments, or to take some other action.

If only one string is plucked, the system displays, or updates the display of, the frequency for that one string. The same is true for two or more strings. This permits the operator to concentrate on tuning one string if that is preferred. This is particularly useful when a string has been replaced, for example.

As long as a string is vibrating with a detectable amplitude, the system can continually update that string's frequency display using a sample and hold process. When the vibration is less than a detectable amplitude, the system can hold the frequency display of the last detectable vibration and provide some indication that the display is not in real time.

BRIEF DESCRIPTION OF THE DRAWING

The above-mentioned and other features and objects of the invention and the manner of attaining them will become more apparent and the invention itself will best be understood by reference to the following description of embodiments of the invention taken in conjunction with the accompanying drawing, a brief description of which follows.

DESCRIPTION OF THE PREFERRED EMBODIMENT

Figure 1:
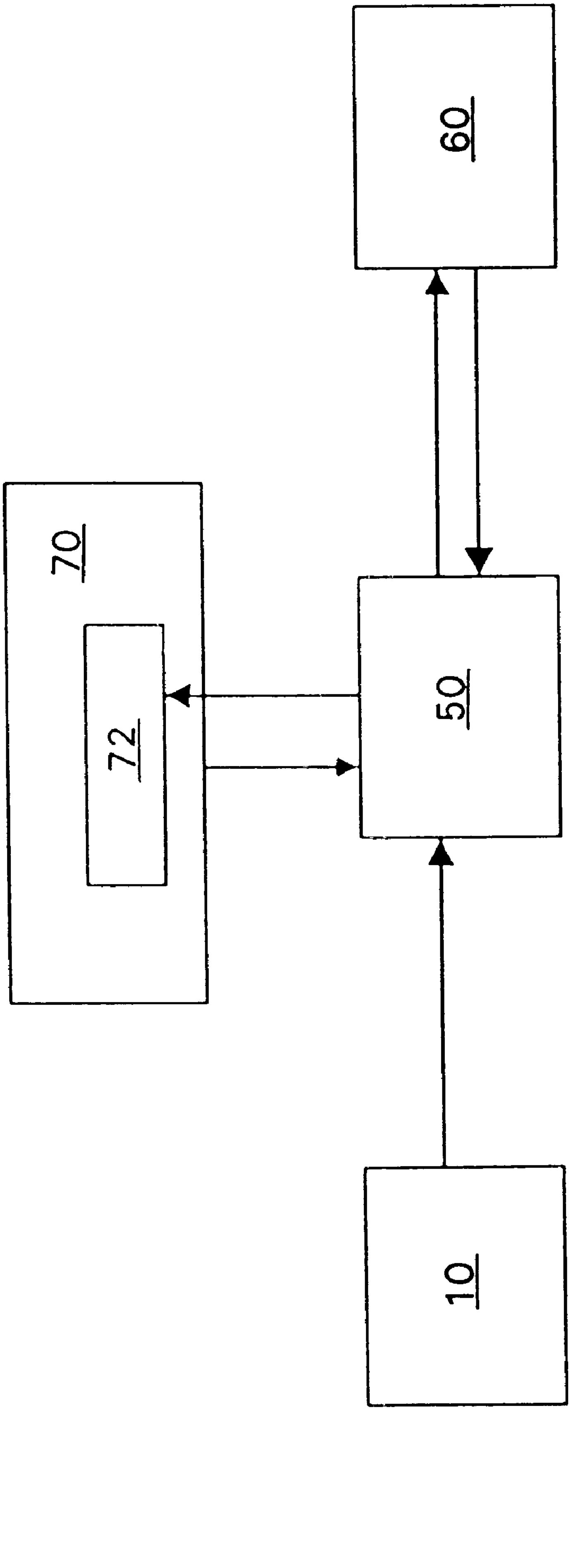
FIG. 1 is a block diagram of a display system utilizing this invention.

When reference is made to the drawing, like numerals indicate like parts and structural features in the various figures. Also, hereinafter, the following definitions apply:

simultaneous display: a display of multiple images which appear to the human eye to be presented concurrently although they may actually be presented sequentially at a speed exceeding the eye's response;

real time: a time sufficiently close to the occurrence of an event as to be indistinguishable by a human observer from the actual time of the occurrence;

target frequency: a desired frequency to which an instrument is to be tuned;

cents: a measure of frequency in which 100 cents equal one half-step; i.e., 1200 cents equal one octave;

frequency indicators: numbers and symbols representing either absolute or relative, or both, values of frequency (for example, a frequency displayed as a note and an offset in cents); and wherein the terms frequency and period are regarded as equally unambiguous measures of frequency.

The invention is a display system for simultaneously showing a plurality of the frequencies comprising a musical sound.

A functional block diagram of the system is shown in FIG. 1. Transducer 10 is coupled to processor 50 which is in turn connected to operator interface 70, which includes display panel 72. Processor 50 is connected to optional memory 60, which can be incorporated in the processor. FIG. 1 depicts simplified functional blocks of the system. It should be recognized that the depicted functions do not show details which should be familiar to those with ordinary skill in the art.

In operation, transducer 10 produces an electrical transducer signal representing a musical sound. Processor 50 receives the transducer signal from transducer 10 and utilizes it to generate a display signal which is used by display unit 72 to display the frequencies of the musical sound. In a preferred embodiment, processor 50 can also receive input from and provide output to the operator via operator interface 70. Transducer 10 can be mechanically mounted with display system elements 50 and 70 to form an integrated tuner.

Figure 2:
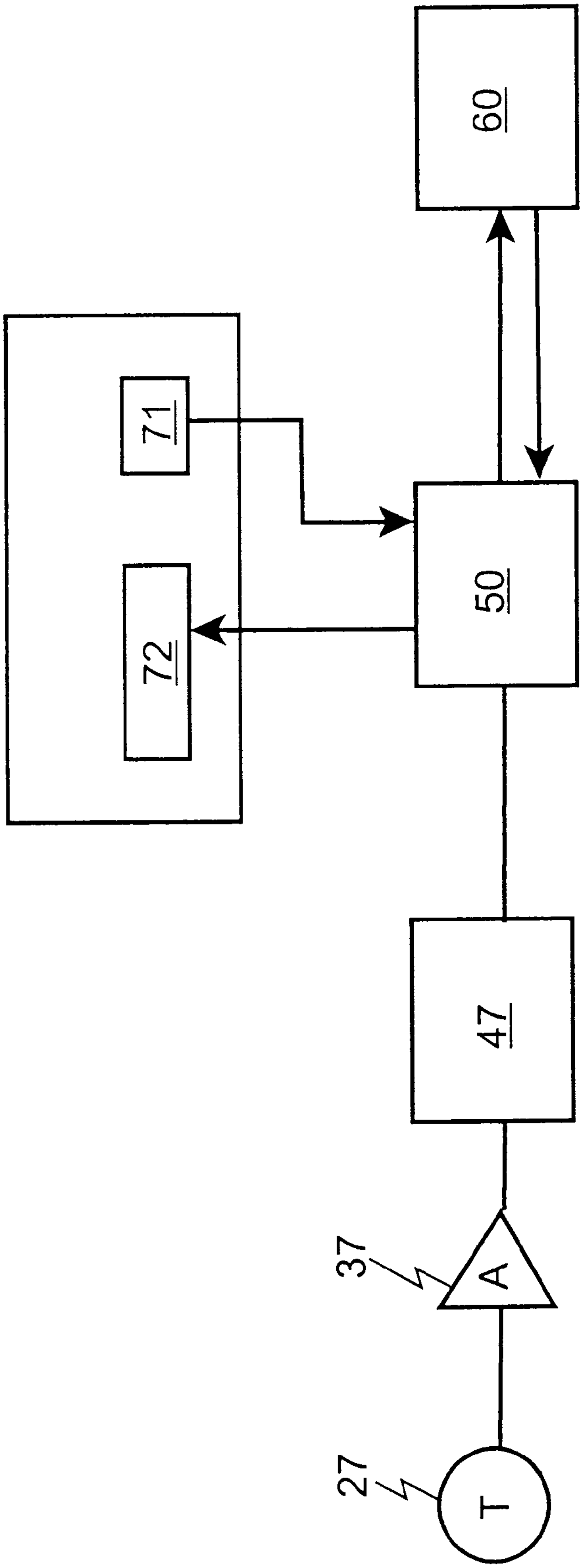
FIG. 2 is a block diagram of a first embodiment of a display system utilizing this invention.

FIG. 2 shows a block diagram of a first embodiment of the invention. Transducer 27 is connected to processor 50 through amplifier 37 and analog-to-digital (ADC) converter 47. Display unit 72 and switch panel 71 are also connected to processor 50.

Transducer 27 is coupled to the musical sound and provides an electrical transducer signal, representing the combined tones of the musical sound, to amplifier 37. The amplified analog transducer signal is digitized by analog-to-digital converter 47 for analysis by processor 50. The amplifier and converter can be part of the processor. The processor includes an analysis means for separating multiple tones within the transducer signal and determining the frequencies of the tones. In this embodiment, processor 50 uses a Fourier transform, or other processing algorithm, to obtain the amplitudes of the frequency spectrum of the transducer signal. Processor 50 then scans the spectrum to identify amplitude peaks and obtain the frequency values of each peak. Thus by use of a Fourier transform the processor first determines the amplitudes of the frequencies of the transducer signal and then, from these amplitudes, picks out the separate tones. From these the processor generates a display signal which is sent to display unit 72. From the display signal, display unit 72 provides a display of the frequencies of the tones comprising the musical sound.

Figure 3:
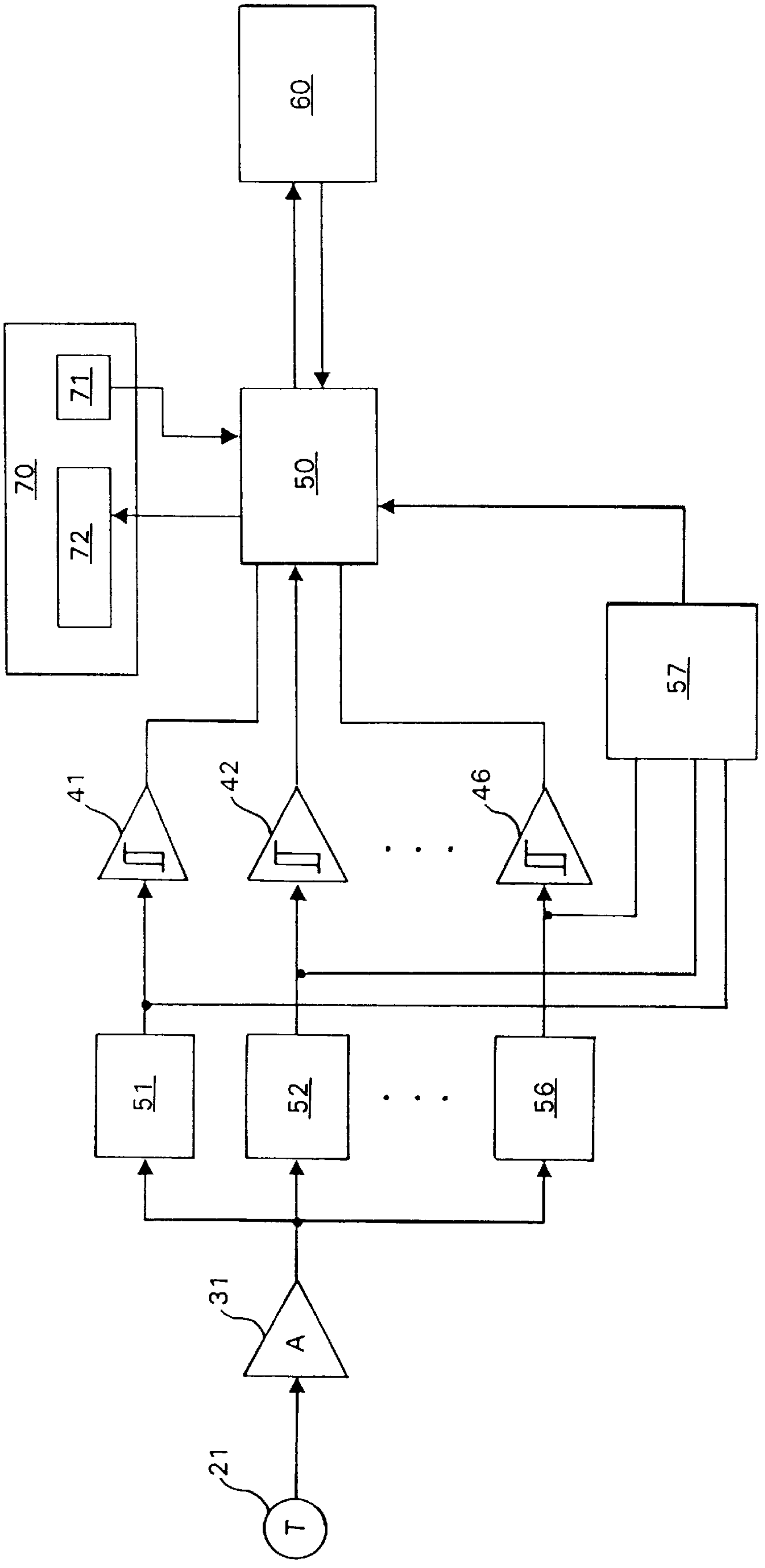
FIG. 3 is a block diagram of an second embodiment of a display system utilizing this invention.

In a second embodiment, shown in FIG. 3, transducer 21 is connected through amplifier 31 to bandpass filters 51–56. Bandpass filter 51 is connected to Schmitt trigger 41 which is connected to processor 50. Likewise, bandpass filters 52–56 are connected to Schmitt triggers 42–46 which are also connected to processor 50. Processor 50 is connected to display unit 72 and switch panel 71. Threshold detector 57 is connected to the outputs of bandpass filters 51–56 and to processor 50.

In operation, a transducer signal containing the frequencies of the musical sound is generated by transducer 21 and applied to the input of amplifier 31. The amplified transducer signal from amplifier 31 is applied to bandpass filters 51–56 which provide an analysis means for separating multiple tones within the transducer signal. Each bandpass filter has a center frequency and bandwidth chosen to separate a frequency of interest from the multiple tones contained in the transducer signal. The filtered signals are applied to the inputs of Schmitt triggers 41–46 each of which is configured to produce a binary output signal having the same frequency as the filtered input signal. The binary signals from the Schmitt triggers are applied to processor 50, which determines the frequencies thereof. The filtered signals are monitored by threshold detector 57 which indicates to processor 50 when each filtered signal has sufficient amplitude to be considered a valid frequency measurement. Detector 57 also compares the relative amplitudes of the filtered signals to differentiate between fundamentals and harmonics. The number of bandpass filters and Schmitt triggers required depends on the width of the frequency spectrum of the transducer signal and the number of frequencies to be displayed. In FIG. 3, the number six, as in the case of a six string instrument, was chosen for example only. The amplifier, filters, triggers and threshold detector can all be part of the processor.

The analysis means of the processor also determines the frequencies of the tones. In this embodiment, processor 50 is a digital computer utilizing a clock signal and a counter to accurately measure the periods of each of the binary signals supplied by Schmitt triggers 41–46. The period measurements can be performed either concurrently or consecutively since only one period of a few milliseconds in duration is needed for each measurement. Also, since the time required for each measurement is small, the measurements can be replicated for greater precision if necessary. Processor 50 uses the period measurements to generate display signals which are provided to display unit 72. The display signals control display unit 72 and provide the data necessary to display the frequency values measured by processor 50.

In an automatic update mode, processor 50 repetitively measures the frequency of each signal and refreshes the corresponding display on display unit 72. In a manual update mode, processor 50 provides a single measurement of each frequency to display unit 72 and that display is held until manually updated or cleared. As used herein, the singular term frequency measurement includes as many sampling measurements as necessary to obtain a statistically valid frequency value.

Optional switch panel 71 provides a way for an operator to provide to processor 50 commands and data for controlling the system. The processor can include memory 60 for storage of instructions and data. Display unit 72 also enables processor 50 to display various kinds of information in addition to frequency (e.g. status, prompts, or data). The combination of switch panel 71 and display unit 72 provides for control inputs such as selection of modes of operation, number of frequencies to be displayed, frequency measurement ranges, reference frequencies, and display formats. For example, the selections could include automatic or manual display updates, actual frequencies measured or deviations from reference frequencies, and a choice between greater frequency resolution and decreased response time.

Figure 4:
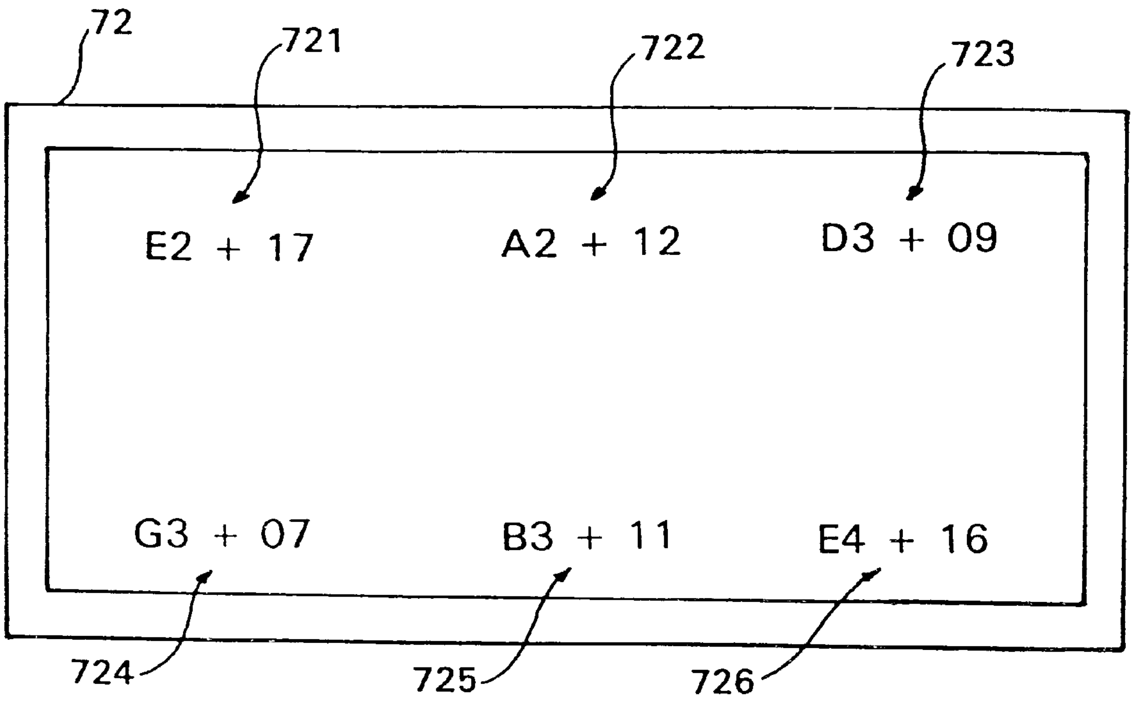
FIG. 4 is a diagram illustrating the frequency display appearing on the display unit.

FIG. 4 shows the frequency display as it appears on display unit 72. In this display, frequency is shown in terms familiar to an operator, i.e., notes, octaves, and cents, instead of Hertz. The six groups of characters 721–726 indicate six measured frequencies. The first two characters in each group, e.g., E2 in group 721, represent the nearest note and the octave. The last three characters in each group, e.g., +17 in group 721, represent the offset in cents of the measured frequency from the note shown in the first two characters of that group. The display unit of this invention can use any format for indicating absolute or relative frequency. For example, each group of characters could display a measured frequency in hertz or just a deviation in hertz or cents from a target frequency. The magnitude of the deviation can be generally indicated, for example by the number of lights illuminated. The display can be limited to indicating whether the measured frequency is sharp or flat with appropriate symbols or colored lights.

The processor of this invention determines the frequency of each tone with an accuracy sufficient for tuning a musical instrument. Since the human ear can generally distinguish a frequency difference of two cents, that is the preferred minimum accuracy of the frequency measurement and display. For discriminating ears, the preferred accuracy is better than one cent.

It should be noted that the preceding figures describe the preferred and alternate embodiments, and that those skilled in the art will recognize other possible implementations of the invention. Some examples are described in the following paragraphs.

In a first example, transducer 10 is a remote, i.e. separate from the display system, microphone placed within receiving distance of the sound source.

In a second example, transducer 10 is the signal pickup mounted on an instrument such as an electric guitar wherein the pickup is normally used to generate the signal supplied to a loudspeaker.

In a third example, transducer 10 comprises a plurality of transducers each coupled to a different sound source or to a different portion of the same source. For example, one transducer sensitive to the bass notes and another to the treble notes can be employed.

In a fourth example, bandpass filters 51–56 and Schmitt triggers 41–46 are integrated into amplifier 31.

In a fifth example, the Schmitt trigger function is performed within processor 50, by anti-bounce latches for example.

Devices for providing a transducer signal include transducers coupled to sound waves such as microphones, magnetic or electric field sensing devices coupled to vibrating elements of an instrument, and optical sensors coupled to vibrating elements. The term transducer is used herein for any device for providing a signal from which a frequency can be obtained, and is not limited to the examples cited above. The term transducer is used in the singular to refer to one or a plurality of devices coupled to the sound source.

Although Schmitt triggers are shown in FIG. 3 for converting an analog signal to a binary signal and for preventing edge slivers in the binary signal, other methods will be obvious to those skilled in the art. Other devices for conditioning a transducer signal for use by a processor include amplifiers, buffers, comparators, filters, and various forms of threshold detectors, zero-crossing detectors, time delay circuits, and voltage level shifters. Conditioning devices can be part of the processor.

Frequency measuring techniques include timers measuring the periods of signals, such as digital counters implemented in either hardware or software, or digital counters counting the number of cycles of a signal in a period of time. Other techniques include the use of Fourier transforms or other processing algorithms, analog or digital filters, and digital signal processors.

Various techniques for interconnecting functional blocks are also available to those skilled in the art. In addition to the usual wired connections are optical, ultrasonic, and radio links which permit remote location of portions of the display system.

Display units include display devices such as light emitting diodes (LEDs), fluorescent displays, various forms of liquid crystal displays (LCDs), and indicator lights. Display units as defined herein also include appropriate display control and data storage devices and driver circuits.

Many of the previously named devices such as fluorescent, light emitting diode, and liquid crystal display units; transducers; analog switches; amplifiers; buffers; comparators; bandpass filters; Schmitt triggers; delay lines and delay networks; counters; timers; multiplexers; optical couplers; and digital signal processors (DSPs) are available as off-the-shelf solid-state integrated circuits. Also readily available are application notes describing various configurations and applications of these devices to signal handling and processing. These devices and the techniques of using them are familiar to those having ordinary skill in the art of signal processing.

While the invention has been described above with respect to specific embodiments, it will be understood by those of ordinary skill in the art that various changes in form and details may be made therein without departing from the spirit and scope of the invention which receives definition in the following claims.

We claim:

1. A multiple frequency tuning display system for use with a transducer coupled to a musical sound, said display system comprising:

a processor, adapted to be coupled to the transducer, having means for receiving a transducer signal from said transducer, analysis means for separating multiple fundamental tones within said transducer signal and determining measured frequencies of said multiple fundamental tones, means for determining deviations of said measured frequencies from corresponding target frequencies and means for generating a display signal from said deviations; and a display unit, for use in tuning said musical sound coupled to said processor, said display unit for receiving said display signal and for simultaneously displaying frequency deviation indicators of at least two of said measured frequencies.

2. The display system of claim 1 wherein said transducer is mechanically mounted with said display system.

3. The display system of claim 2 wherein said transducer is a microphone.

4. The display system of claim 1 wherein said transducer is remote from said display system.

5. The display system of claim 4 wherein the source of the musical sound is a musical instrument and wherein said transducer is mounted on said musical instrument.

6. The display system of claim 5 wherein said transducer is magnetically coupled to said musical instrument.

7. The display system of claim 5 wherein said transducer is acoustically coupled to said musical instrument.

8. The display system of claim 5 wherein said transducer is optically coupled to said musical instrument.

9. The display system of claim 1 wherein said analysis means utilizes a Fourier transform.

10. The display system of claim 1 wherein said analysis means utilizes a plurality of bandpass filters to separate said multiple tones.

11. The display system of claim 10 wherein said analysis means further utilizes period measurement to determine said measured frequencies of said multiple tones.

12. The display system of claim 1 wherein said display signal is generated in real time.

13. The display system of claim 1 wherein said display signal is generated in real time.

14. The display system of claim 12 wherein said display signal is continually updated.

15. The display system of claim 12 wherein the accuracy of said frequency indicators is sufficient for tuning a musical instrument.

16. The display system of claim 15 wherein said accuracy is within two cents.

17. The display system of claim 16 wherein said accuracy is within one cent.

18. The display system of claim 12 wherein said transducer is a microphone mechanically mounted with said display system.

19. The display system of claim 12 wherein said transducer is remote from said display system.

20. The display system of claim 19 wherein the source of the musical sound is a musical instrument and wherein said transducer is mounted on, and magnetically coupled to, said musical instrument.

21. The display system of claim 19 wherein the source of the musical sound is a musical instrument and wherein said transducer is mounted on, and acoustically coupled to, said musical instrument.

22. The display system of claim 12 wherein said analysis means utilizes a Fourier transform.

23. The display system of claim 12 wherein said analysis means utilizes a plurality of bandpass filters to separate said multiple tones.

* * * * *

UNITED STATES PATENT AND TRADEMARK OFFICE

CERTIFICATE OF CORRECTION

PATENT NO. : 6,066,790

DATED : May 23, 2000

INVENTOR(S) : Freeland et al.

It is certified that error appears in the above-identified patent and that said Letters Patent is hereby corrected as shown below:

<u>In the claims</u>:

In column 7, delete Claim 13 and replace with:

--13. The display system of claim 12 wherein said analysis means further determines note, octave and cents deviation of each of said measured frequencies and wherein said frequency indicators show the note, octave and cents deviation of each of said measured frequencies.--

Signed and Sealed this

Twenty-seventh Day of March, 2001

*Attest:*

NICHOLAS P. GODICI

*Attesting Officer*

*Acting Director of the United States Patent and Trademark Office*